United States Patent
Beuschel et al.

(10) Patent No.: US 10,522,278 B2
(45) Date of Patent: *Dec. 31, 2019

(54) PNEUMATIC SOLENOID VALVE

(71) Applicant: Conti Temic microelectronic GmbH, Nuremberg (DE)

(72) Inventors: Michael Beuschel, Stammham (DE); Markus Ziegelmeier, Buxheim (DE); Stefan Bauer, Engelbrechtsmuenster (DE); Alexander Kerler, Titting OT Petersbuch (DE); Martin Kolbinger, Riedenburg/Buch (DE); Holger Fernengel, Ingolstadt (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/766,214

(22) PCT Filed: Sep. 21, 2016

(86) PCT No.: PCT/EP2016/072439
§ 371 (c)(1),
(2) Date: Apr. 5, 2018

(87) PCT Pub. No.: WO2017/060090
PCT Pub. Date: Apr. 13, 2017

(65) Prior Publication Data
US 2018/0301264 A1    Oct. 18, 2018

(30) Foreign Application Priority Data
Oct. 5, 2015    (DE) .................. 10 2015 219 176

(51) Int. Cl.
H01F 7/17    (2006.01)
H01F 7/14    (2006.01)
(Continued)

(52) U.S. Cl.
CPC ........... *H01F 7/14* (2013.01); *F16K 31/0675* (2013.01); *F16K 31/0682* (2013.01);
(Continued)

(58) Field of Classification Search
CPC ... H01F 7/088; H01F 7/12; H01F 7/14; H01F 7/08; H01F 7/1607; H01F 7/17;
(Continued)

(56) References Cited

U.S. PATENT DOCUMENTS 2,850,258 A    9/1958  Lazich
3,722,531 A *  3/1973  Verhart ............... F15B 13/0405
                                                        137/271
(Continued)

FOREIGN PATENT DOCUMENTS

CN    102654210 A    9/2012
CN    104100756 A    10/2014
(Continued)

OTHER PUBLICATIONS

Office Action dated Jul. 28, 2016 from corresponding German Patent Application No. 10 2015 219 176.1.
(Continued)

*Primary Examiner* — Craig J Price

(57) ABSTRACT

Disclosed is a pneumatic solenoid valve comprising an air chamber with multiple air connections which can be connected via multiple switching positions of the valve by interconnecting the air chamber. The valve comprises a magnetic coil, a yoke arranged on the coil, and an armature arranged about the yoke and able to move relative to the yoke, all within the air chamber. When the coil is energized, the magnetic force generated rotates the armature about a single axis of rotation against a restoring force, until the magnetic force corresponds to the restoring force. When the armature rotates, the size of at least one overlapping region
(Continued)

between the yoke and the armature changes, wherein an air gap is formed between the yoke and the armature. The distance of the air gap between the yoke and the armature remains substantially constant in the direction of rotation of the armature.

18 Claims, 2 Drawing Sheets

(51) Int. Cl.
  *H01F 7/08* (2006.01)
  *H01F 7/12* (2006.01)
  *F16K 31/06* (2006.01)
(52) U.S. Cl.
  CPC .............. *H01F 7/088* (2013.01); *H01F 7/12* (2013.01); *H01F 7/17* (2013.01); *Y10T 137/86622* (2015.04); *Y10T 137/86847* (2015.04)
(58) Field of Classification Search
  CPC ............. F16K 31/0675; F16K 31/0682; F16K 31/0627; B60N 2/914; B60N 2/44; B60N 2/4415; B60N 2/7082; B60R 16/08; Y10T 137/86493–86895
  USPC .............. 137/625.65, 625.44; 251/64, 129.2, 251/129.16; 335/193, 247, 248, 279
  See application file for complete search history.

(56) References Cited

U.S. PATENT DOCUMENTS

| | | | |
|---|---|---|---|
| 3,982,562 A | 9/1976 | Pickett | |
| 4,250,924 A * | 2/1981 | Sakakibara | F16K 31/0624 137/596.17 |
| 4,446,889 A * | 5/1984 | Sakakibara | F16K 31/0624 137/625.4 |
| 4,534,381 A * | 8/1985 | Hozumi | F16K 31/0682 137/625.65 |
| 4,545,563 A * | 10/1985 | Morioka | F16K 31/0624 137/625.2 |
| 4,562,866 A * | 1/1986 | Nicolas | F16K 31/10 137/625.64 |
| 5,048,564 A * | 9/1991 | Gaiardo | F16K 27/003 137/599.07 |
| 5,139,226 A * | 8/1992 | Baldwin | F16K 31/0682 137/625.44 |
| 5,318,071 A * | 6/1994 | Gaiardo | F16K 31/0682 137/625.44 |
| 5,603,482 A | 2/1997 | Mott et al. | |
| 5,653,422 A * | 8/1997 | Pieloth | F16K 31/0682 137/596.17 |
| 6,311,951 B1 * | 11/2001 | Samulowitz | F16K 31/0682 251/129.16 |
| 6,726,173 B2 * | 4/2004 | Hettinger | F16K 11/052 251/129.17 |
| 6,786,238 B2 * | 9/2004 | Frisch | F16K 31/0682 137/625.44 |
| 6,830,231 B2 * | 12/2004 | Paessler | F16K 31/0682 251/129.16 |
| 8,096,952 B2 * | 1/2012 | Takahashi | H01F 7/14 600/485 |
| 8,613,421 B2 * | 12/2013 | Ams | F16K 31/0682 137/625.42 |
| 8,777,180 B2 * | 7/2014 | Doerr | F16K 31/0682 137/625.44 |
| 9,631,737 B2 * | 4/2017 | Brust | F16K 27/003 |
| 10,024,452 B2 * | 7/2018 | Ohki | F16K 31/06 |
| 10,221,957 B2 * | 3/2019 | Ohta | F16K 31/06 |
| 2003/0226601 A1 * | 12/2003 | Frisch | F16K 31/0682 137/625.65 |
| 2007/0239042 A1 * | 10/2007 | Takahashi | F16K 31/0682 600/498 |
| 2010/0038572 A1 * | 2/2010 | Alvarez | F16K 31/0682 251/129.15 |
| 2019/0118690 A1 * | 4/2019 | Beuschel | B60N 2/914 |

FOREIGN PATENT DOCUMENTS

| | | |
|---|---|---|
| DE | 1247793 B | 8/1967 |
| DE | 19860272 B4 | 3/2005 |
| DE | 102005060217 B4 | 10/2008 |
| DE | 102008060342 B3 | 7/2010 |
| DE | 102013220557 A1 | 4/2015 |
| EP | 1615242 A2 | 1/2006 |
| WO | 2013/011340 A1 | 1/2013 |

OTHER PUBLICATIONS

International Search Report and Written Opinion dated Dec. 15, 2016 from corresponding International Patent Application No. PCT/EP2016/072439.

* cited by examiner

PNEUMATIC SOLENOID VALVE

The invention relates to a pneumatic solenoid valve.

Pneumatic solenoid valves are used for controlling air flows in a multiplicity of technical fields of application. In these solenoid valves, a magnetic force is generated by means of a magnet coil and a switching procedure of the valve is triggered on account thereof. An application sector for such solenoid valves is filling elastic air bladders in a device for the pneumatic adjustment of a seat in a transportation means such as, for example, a motor vehicle seat.

Conventional solenoid valves have the disadvantage that the magnetic force in the activation of said solenoid valves by energizing the magnet coil increases in a disproportionate manner, this manifesting itself in a loud switching noise in the form of clicking. The cause therefor is that the air gap between the magnet coil, or a yoke assigned thereto, and a movable armature decreases as the travel decreases, this leading to an increase of the magnetic force as the travel performed increases. This leads to a high velocity of the armature, the latter being decelerated in an abrupt manner only when impacting on a respective stop.

A method for reducing the creation of noise in an solenoid valve is known from the publication DE 198 60 272 B4, in which method the energizing of the magnet coil increases or decreases, respectively, in a ramp-like manner as the valve is activated.

It is moreover known for the magnetic circuit in a solenoid valve to be designed in such a manner that the magnetic flow increases substantially only on account of the current of the magnet coil and no longer on account of the movement of the armature.

A valve assembly having a common winding and valve nozzle carrier for two solenoid valves is known from the document DE 10 2008 060 342 B3. The document WO 2013/011340 A1 furthermore shows a valve assembly having windings in the pressurized valve chamber.

It is an object of the invention to achieve a pneumatic solenoid valve which has minor switching noises while simultaneously providing a high level of efficiency and limited heating of the magnet coil.

Said object is achieved by the solenoid valve as claimed in patent claim 1. Refinements of the invention are defined in the dependent claims.

BRIEF SUMMARY

The pneumatic solenoid valve according to the invention comprises an air chamber (valve chamber) on which a plurality of air connectors which are switchable by way of a plurality of switching positions of the solenoid valve, with the intercalation of the air chamber, are provided. The solenoid valve in a manner known per se comprises a magnet coil, a yoke from a soft magnetic material that is disposed on the magnet coil, and an armature that is movable relative to the yoke, which are likewise formed from a soft magnetic material.

In the solenoid valve according to the invention, the magnetic circuit, that is to say the magnet coil, the yoke, and the armature, is disposed entirely within the air chamber of the valve. Furthermore, the armature in relation to the yoke is disposed in such a manner that said armature, when the magnet coil is energized, by means of the magnetic force generated on account thereof rotates counter to a restoring force about a single rotation axis until the magnetic force corresponds to the restoring force, wherein the size of at least one overlap region between the yoke and the armature changes in the rotation of the armature in the at least one overlap region, and an air gap is configured between the yoke and the armature. The spacing that is formed by the air gap between the yoke and the armature in the direction of the rotation of the armature remains substantially constant. This spacing, at least in portions, can also remain constant in the direction that is perpendicular to the rotation of the armature but, optionally, can also vary in said direction.

The solenoid valve according to the invention has the advantage that by way of the substantially constant air gap a proportionally actuatable valve is achieved, such that no loud noise is created in the activation of the valve. The valve thus has minor switching noises. Moreover, it is achieved by the arrangement of the entire magnetic circuit in the air chamber that no further sealing planes which otherwise, by way of additional air gaps, reduce the effective magnetic circuit are required. Furthermore, efficient cooling of the magnet coil is ensured by respective air flows in the air chamber.

In a particularly preferred embodiment, the solenoid valve according to the invention is designed in such a manner that a constant (that is to say travel-independent) magnetic force or a magnetic force that increases in a linear manner over the path is configured when the magnet coil is energized. A magnetic force that increases in a linear manner can also be achieved, for example, by way of a linear increase in the current of the magnet coil in the switching procedure of the valve. In this embodiment, the restoring force simultaneously increases during the rotation of the armature, on account of which it is achieved that the armature assumes a predefined terminal position. It is ensured herein that the restoring force increases at a faster pace than a magnetic force that potentially increases in a linear manner.

The restoring force in the solenoid valve according to the invention can be generated in various ways. To this end, in one preferred variant a leaf spring is attached to the armature.

In a further design embodiment of the solenoid valve according to the invention, the yoke is contacted by the armature at at least one location, preferably along the single rotation axis. The lost output of the solenoid valve can be minimized on account thereof. In a further particularly preferred embodiment, a lever mechanism on the armature is configured in such a manner that the magnetic force which arises at that end of the armature that is opposite to the rotation axis when the magnet coil is energized is converted to a greater force for closing an air opening or for opening an air opening.

In one further design embodiment, the armature of the solenoid valve according to the invention is rigidly connected to a protrusion, wherein a seal element is located on the protrusion, which seal element in the rotation of the armature by means of the magnetic force which is generated by energizing the magnet coil closes an air opening. Without the magnet coil being energized, the seal element preferably closes another air opening. A simple conversion of the magnetic force to a closing force for an air opening is achieved in this way. The protrusion on which the seal element is located herein is preferably part of the lever mechanism described above, that is to say that the closing force that is generated on the seal element is greater than the magnetic force at that end of the armature that is opposite the rotation axis.

In a further design embodiment of the solenoid valve according to the invention the armature comprises at least one opening into which an end of the yoke penetrates in the rotation of the armature, and herein the spacing formed by the air gap between the yoke and the armature (i.e. The spacing between opening edge and yoke) remains substantially constant in the direction of the rotation of the armature.

In one further embodiment, the armature by way of a guide is secured against tilting about the rotation axis, wherein the guide is preferably configured on a coil body that is associated with the magnet coil, that is to say on a winding body onto which the winding of the magnet coil is wound. The guide herein can be implemented in various ways. In one variant, the guide comprises a guiding cam which extends through an opening of the armature. In another variant, the guide comprises a leaf spring which at at least one location is fixedly connected to the armature, and at at least one other location is fixedly connected to the coil body or to the yoke.

In a refinement of the invention, at least part of the yoke is disposed in an internal cavity of a coil body that is associated with the magnet coil. The internal cavity of the coil body is preferably completely filled with the soft magnetic material of the yolk such that the coil in terms of the diameter can be constructed so as to be small, the electrical efficiency being increased on account thereof.

In a further embodiment of the solenoid valve according to the invention, the yoke is designed so as to be U-shaped, wherein an overlap region between the yoke and the armature is created at the end of at least one leg of the yoke when the armature is rotated.

In a further preferred embodiment of the solenoid valve, the air openings are disposed at opposite ends of the air chamber. The magnet coil herein, in terms of the longitudinal direction thereof, preferably extends between these opposite ends. Very efficient cooling of the magnet coil when the latter is being energized is achieved by way of this variant of the invention.

In order for a current to be supplied to the magnet coil, the latter in a preferred variant is connected to at least one pin, preferably two or more pins, said pin by way of a sealed opening being routed out of the air chamber toward a circuit board.

The valve according to the invention can be provided for various application purposes. The solenoid valve preferably serves for filling and/or emptying at least one elastic air bladder in a device for the pneumatic adjustment of a seat in a transportation means. In other words, the invention also comprises a device for the pneumatic adjustment of a seat in a transportation means, said device having at least one elastic air bladder and a solenoid valve for filling and/or emptying the at least one air bladder.

The solenoid valve according to the invention, depending on the design embodiment, can have a variable number of air openings and switching positions. The solenoid valve in a particularly preferred embodiment is a 3/2 switchover valve.

BRIEF DESCRIPTION OF THE SEVERAL VIEWS OF THE DRAWINGS

An exemplary embodiment of the invention will be described in detail hereunder by means of the appended figures.

In the figures.

DETAILED DESCRIPTION

Figure 1:
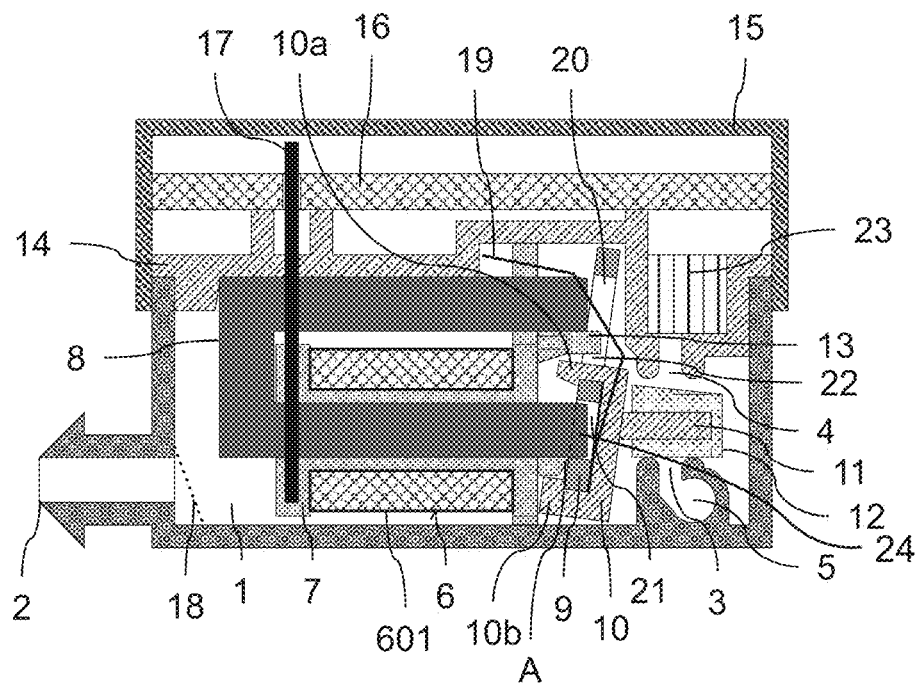
FIG. 1 shows a sectional view of a solenoid valve according to an embodiment of the invention, having a non-energized magnet coil.

An embodiment of the invention by means of a 3/2 solenoid valve will be described hereunder, said 3/2 solenoid valve being used for filling and venting an elastic air bladder (not shown) in a device for the pneumatic adjustment of a motor vehicle seat. The solenoid valve comprises an air chamber 1 having respective air connectors 2, 3, and 4. The upper side of the air chamber is covered in an airtight manner by a cover plate 14. A circuit board 16 is located above the cover plate 14, said circuit board 16 in turn being covered by means of a lid 15.

The air connector 2 of the air chamber 1 leads to the air bladder. Filling of the air bladder is performed by a compressed air supply (not shown) which is connected at the duct 5, which, in turn, by way of the air opening 3, is connected to the air chamber 1. The upper opening 4 which with the intercalation of a damper element 23 from foam is connected to the environment is used for venting or discharging, respectively, compressed air from the air bladder. The noises of the valve that are audible outside are reduced on account of the damper element.

A magnet coil 6 is arranged within the air chamber 1. This coil comprises a winding 601 which is wound onto a coil body 7. Furthermore, a U-shaped yoke 8 from a soft magnetic material is disposed in the air chamber, wherein the lower leg of the U-shaped yoke extends through a cavity of the coil body 7. The upper leg of the yoke 8 runs past the winding 601 of the coil body and extends through an opening in an upper appendage of the coil body 7.

Furthermore, the armature 9 that is shown in the section and is composed of a soft magnetic material and, when the coil 6 is energized, is rotated by means of a magnetic force about a single rotation axis A, as is yet to be explained in more detail further below, is located within the air chamber 1. Openings are punched into the armature. The armature comprises in particular an upper opening 20, a T-shaped opening 22 that adjoins the former (cf. FIG. 3), and a lower opening 21. The openings 20 and 21 are designed so as to be square (cf. FIG. 3), but can also have other cross sections (in particular rectangular and for the opening 20 also circular or elliptic cross sections, to which the description hereunder then applies in a correspondingly modified manner). The lower edge of the opening 21 bears on the lower leg of the yoke 8, on account of which a contact line is formed between the yoke and the armature, said contact line also representing the rotation axis A of the armature 9 when the coil 6 is energized.

A clip 10 from which a protrusion 11 projects is fastened to the armature 9, an elastic seal element 12 being located on said protrusion 11. In the non-energized state of the coil shown in FIG. 1, the seal element 12 bears on the opening 3, whereas the opening 4 is open. In this switching position of the valve, venting of the bladder by way of an air flow from the connector 2 by way of the air chamber 1 toward the opening 4 is performed.

Figure 2:
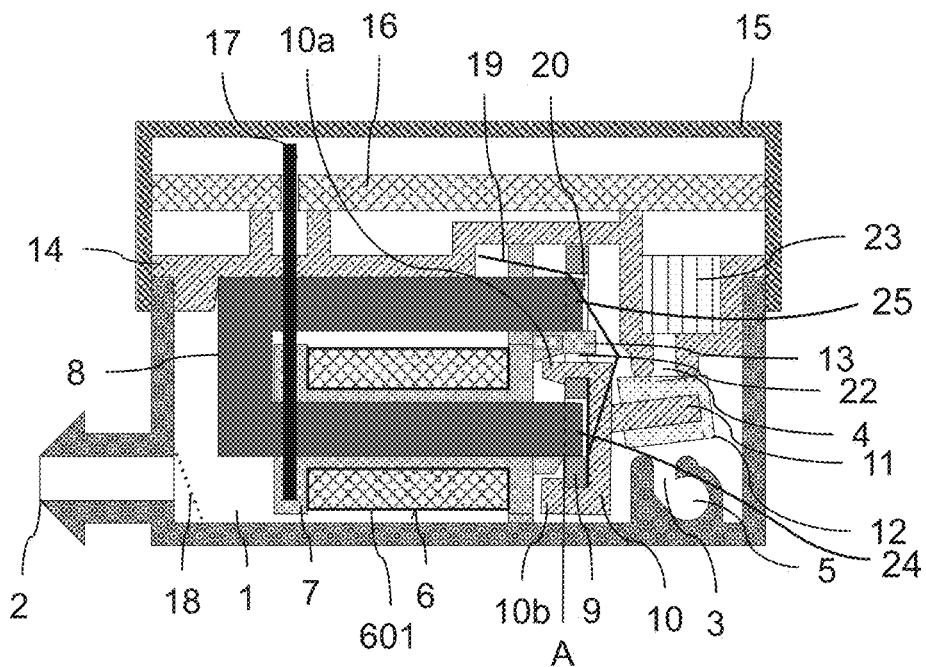
FIG. 2 shows a sectional view analogous to that of FIG. 1, in the case of an energized magnet coil.
Figure 3:
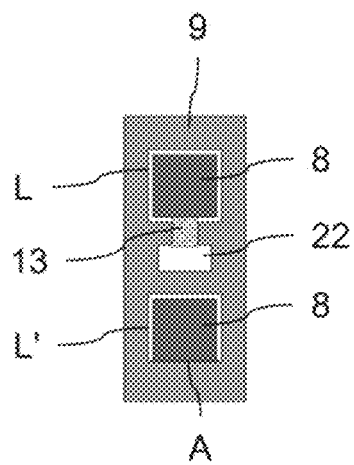
FIG. 3 shows a plan view of the armature that is installed in the solenoid valve of FIG. 1 and FIG. 2.

The coil body 7 comprises a guiding cam 13 which prevents tilting of the rotation axis A of the armature 9 in that the guiding cam is guided in the opening 22 (cf. FIG. 3). When the coil 6 is energized a magnetic force which pulls the armature 9 toward the yoke 8 is generated. Herein, the four edges of the upper square opening 20 and the upper end of the yoke 8 overlap. A corresponding overlap of three edges of the lower opening 21 and the lower end of the yoke 8 is likewise enlarged. FIG. 2 herein shows the terminal position of the armature 9 when the coil is energized. As can be seen, the armature 9 is now no longer tilted in relation to the yoke 8 but extends in the vertical direction.

In the magnet coil shown, the air gap L between the edges of the upper square opening 20 and the yoke 8, and the air gap L' between the edges of the lower square opening 21 and the yoke 8, in the direction of the rotation of the armature remains substantially constant, independently of the size of the overlap between the yoke and the armature. This is highlighted once more in FIG. 3. In particular, the air gap L between the periphery of the upper opening 20 and the upper leg of the yoke 8, and the air gap L' between the periphery of the lower opening 21 and the lower leg of the yoke 8 can be seen here. It is to be noted herein that there is no air gap along the lower edge of the opening 21, since the yoke and the armature contact one another directly on a contact line there. The rotation axis A of the armature runs along said contact line, as has already been mentioned at the outset.

According to FIG. 3, the size of the air gap L or L', respectively, along the edges of the opening is constant. However, it is not mandatory for this to be implemented in such a manner. Rather, it is decisive that the spacing created by the air gaps between the armature 9 and the yoke 8 remains constant in the rotation direction of the armature, that is to say along respective lines that run perpendicularly to the sheet plane. By contrast, the size of the air gap along the circumference of the openings 20 and 21 can optionally vary. In particular, the left and the right side of the air gap L' can also run downward in a slightly oblique manner, for example. It is achieved on account thereof that the armature in the region of the rotation axis A is centered in relation to the yoke. The size of the air gap at the remaining edges is approximately 0.2 mm.

It is achieved on account of the substantially constant air gap in the direction of the rotation of the armature 9 that the magnetic force acting on the armature depends now only on the current and not on how close the armature has come to the yoke. As opposed to conventional solenoid valves in which the air gap is reduced as the armature is increasingly displaced, the magnetic force being increased on account thereof, a proportional valve, the magnetic force of which is constant when the coil is constantly energized, is achieved by way of the solenoid valve of FIG. 1 and FIG. 2. A leaf spring 19 which acts counter to the magnetic force and thus generates a restoring force is herein furthermore provided in the solenoid valve of FIG. 1 and FIG. 2, respectively. The leaf spring in the upper region is fastened to the coil body 7, and in the lower region is fastened to the armature 9 and to the clip 10. The restoring force is continuously increased as the armature is increasingly rotated when the coil is energized, until said restoring force is finally equal to the constant magnetic force, on account of which the terminal position of the armature, shown in FIG. 2, is reached. The construction of the leaf spring 19 will be explained in more detail further below by means of FIG. 4. The construction of the clip 10 will likewise be explained in more detail further below by means of FIG. 5.

As can be seen from FIG. 2, the energizing of the coil leads to a rotation of the armature 9 about the rotation axis A. In the terminal position shown in FIG. 2, the seal element 12 then bears in a sealing manner on the upper opening 4, whereas the opening 3 of the air duct 5 is now open. In this switching position, compressed air that emanates from a compressed air supply is guided by way of the duct 5, the chamber 1, and the connector 2, toward the air bladder in order for the latter to be filled. The valve of FIG. 1 and FIG. 2 thus represents a 3/2 switchover valve having three air connectors and two switching positions.

The energizing of the winding 601 of the coil 6 is performed by way of electrical pins 17 which extend through an opening of the cover plate 14 and are connected to a respective electrical contact of the circuit board 16. The opening in the cover plate herein is sealed, for example by adhesive bonding, press fitting, or injecting. No air from the pressurized air chamber 1 thus exits by way of this opening. A mesh filter 18 which avoids the ingress of particles from the elastic air bladder can be further seen in FIG. 1 and FIG. 2.

Furthermore, the shape of the central opening 22 of the armature 9 can be seen in FIG. 3 already mentioned above. The opening has the shape of an upside-down letter T, wherein the guiding cam 13 which prevents lateral tilting of the armature 9 engages in the vertical beam of the letter T. By contrast, the vertical beam of the letter T serves for an upper latching cam 10a of the clip 10 to pass through. This latching cam can be readily seen in FIG. 5 explained further below.

Figure 4:
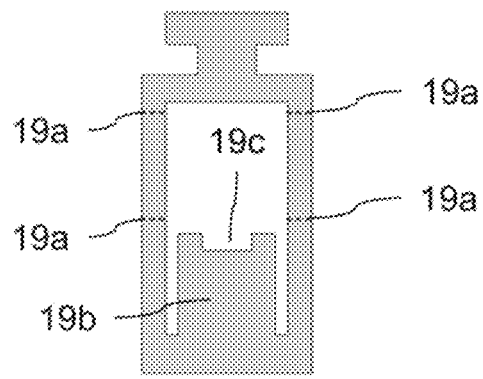
FIG. 4 shows a plan view of the leaf spring that is installed in the solenoid valve of FIG. 1 and FIG. 2.

The leaf spring 19 that has been illustrated in the section in FIG. 1 and FIG. 2 can once again be seen in the plan view in FIG. 4. The leaf spring is composed of a metal sheet which is bent at four locations 19a. The leaf spring at the upper end has the shape of a T. The fastening of the leaf spring to the coil body 7 is performed there. A projecting tab 19b having a clearance 19c is located within a central opening of the leaf spring. In the installed state of the leaf spring, the tab 19b bears on the internal face of the clip 10, wherein the latching cam 10a of the clip 10 has been pushed over the clearance 19c. The lower part of the armature 9 is inserted into the clip 10 having the tab 19b inserted therein. The armature herein is latched to the clip 10 by way of the latching cam 10a and of the two lower latching cams 10b (cf. FIG. 5). A respective restoring force is generated by the tab 19b being bent in relation to the remaining part of the leaf spring 19. Said restoring force, in the increasing rotation of the armature when the coil is energized, becomes greater until the terminal position at which the magnetic force generated corresponds to the restoring force of the leaf spring has finally been reached.

In the installed state, on the one hand, a force which pulls the armature 9 upward and in the direction toward the magnetic coil in order for the rotation axis A of the armature 9 to be fixed is generated by means of the leaf spring 19. On the other hand, the deformation of the leaf spring at the height level of the rotation axis A generates a torque which tilts the armature away from the coil 6 and simultaneously urges the seal element 12 onto the lower opening 3 of the air duct 5. This torque is absorbed by the latch-fitting of the leaf spring at the upper end of the coil carrier 7.

Figure 5:
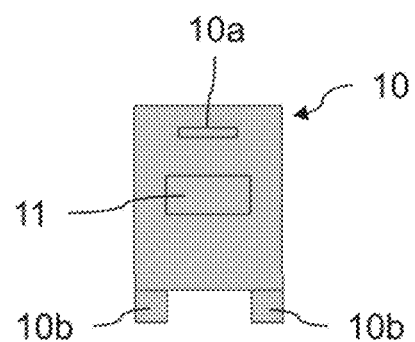
FIG. 5 shows a plan view of the clip that is installed in the solenoid valve of FIG. 1 and FIG. 2.

As has already been mentioned, FIG. 5 shows a plan view of the clip 10 from FIG. 1 and FIG. 2. The three protrusions 10a and 10b by way of which the armature is latch-fitted in the clip can be seen herein. Furthermore, the protrusion 11 on which the seal element 12 is located can also be seen once again.

The substantial component parts of the solenoid valve from the preceding figures, and the technical effects of said component parts, will be explained once again hereunder. In the solenoid valve, the magnetic circuit composed of the magnet coil 6, the yoke 8, and the armature 9 is located in a common air chamber 1, that is to say within the pneumatically operated region of the valve. Cooling of the magnet coil can be effected in this way in that the pneumatic air flow is guided along the winding, this being ensured by the arrangement of the air connector 2 and of the air connectors 3 and 4 at opposite ends of the air chamber 1. The arrangement of the magnetic circuit within the air chamber furthermore has the advantage that no further sealing planes which otherwise reduce the magnetic efficiency on account of additional air gaps are required.

The air gaps L and L', respectively, in the overlapping region 25 and 24 between the armature and the yoke are substantially constant in the rotation direction of the armature, on account of which a constant magnetic force which leads to a silent switching procedure of the valve is achieved when the coil is energized in a constant manner. The magnetic force, on account of the coil being increasingly energized in a linear manner, can optionally also be slightly increased. The increasing restoring force of the leaf spring herein ensures that a predefined terminal position of the armature is reached. Guiding the armature by means of the guiding cam 13 has the effect that only one degree of freedom is possible in terms of the movement of the armature, specifically the rotation of the latter about the axis A. On account of the arrangement of the armature having the clip 10 and the respective seal element 12 fastened thereto, a lever mechanism is moreover achieved since the spacing between the rotation axis A and the upper end of the armature is larger than between the rotation axis and the position of the seal element 12. The force by way of which the seal element is urged against the opening 4 is amplified in this manner. Thus, a high force is achieved for sealing the opening 4 while at the same time achieving a small valve lift.

The valve of FIG. 1 and FIG. 2 as a rotation axis A has a contact line between the armature 9 and the yoke 8, which in magnetic terms acts as a minimal air gap, on account of which the lost output of the magnetic circuit is minimized. The armature 9 of the magnetic circuit has respective punched features for the ends of the yoke 8 and the guiding cam 13 of the coil body 7 to pass through. The gap between the armature and the guiding cam herein has to have tighter tolerances than the gap between the armature and the yoke. The yoke 8 in the case of the non-energized solenoid valve passes only partially through the openings in the armature, as the overlapping area of the air gap cannot be further increased in the case of said yoke 8 passing through completely, as this would result in a magnetic force no longer being generated.

The rotation axis A of the armature 9 can also be secured against tilting by means of a leaf spring (preferably a leaf spring other than the spring 19) instead of by means of a guiding cam 13. In this case, the leaf spring is fixedly connected (by way of a form-fit or a materially-integral fit, for example) to the armature at at least one location (preferably at two points). The leaf spring is additionally fixed to a stationary component at another location, said stationary component preferably being the coil body or the yoke.

The two ends of the yoke 8 can optionally have a suitable contour in order for the size of the overlap between the yoke and the armature to be controlled. Nevertheless, the size of the air gap in the direction of the rotation of the armature herein remains constant. On account thereof, the magnetic force as a function of travel, or of the tilting angle of the armature, respectively, can be influenced in a suitable manner.

The elastic sealing faces of the seal element 12 which serves for sealing the openings 3 and 4, by tilting the armature 9 in mechanical terms, are guided such that said sealing faces at all times come to bear at the same position on the associated openings. This improves the tightness in particular in the case of low temperatures.

The interior of the coil 6 (that is to say the cavity of the coil body 7) in the solenoid valve of FIG. 1 and FIG. 2 is not used for guiding air but exclusively for receiving the soft magnetic yoke 8. On account thereof, the coil in terms of diameter can be constructed so as to be comparatively small, this in turn increasing the electrical efficiency (shorter wire length and lower coil resistance, respectively; alternatively a higher number of windings). It is herein additionally advantageous for the coil in the case of a given number of windings to be constructed so as to be as thin and long as possible.

The above-described embodiments of the invention have numerous advantages. In particular, a proportionally actuatable solenoid valve having minor switching noises is achieved in a simple manner. Moreover, efficient cooling of the solenoid valve and a high degree of magnetic efficiency is achieved in that the entire magnetic circuit is disposed in the respective air chamber of the valve. A movement of the armature having only one degree of freedom about a single rotation axis is effected herein. Furthermore, a respective lever mechanism can be provided for increasing the closing force of the valve, while simultaneously reducing the travel of the valve.

LIST OF REFERENCE SIGNS

1 Air chamber
2, 3, 4 Air connectors
5 Air duct
6 Magnet coil
601 Winding of the magnet coil
7 Coil body of the magnet coil
8 Yoke
9 Armature
10 Clip
10a, 10b Latching cams of the clip
11 Protrusion of the clip
12 Seal element
13 Guiding cam of the coil body
14 Cover plate
15 Lid
16 Circuit board
17 Pin
18 Mesh filter
19 Leaf spring
19a Bend points of the leaf spring
19b Tab of the leaf spring
19c Clearance on the tab of the leaf spring
20, 21, 22 Openings in the armature
23 Damping element
L, L' Air gaps
A Rotation axis

The invention claimed is:
1. A pneumatic solenoid valve comprising:
an air chamber on which a plurality of air connectors which are switchable by way of a plurality of switching positions of the solenoid valve, with the interconnection of the air chamber, are provided, wherein the solenoid valve comprises a magnet coil, a yoke from a soft magnetic material that is disposed on the magnet coil, and an armature from a soft magnetic material that is movable relative to the yoke, wherein the magnet coil, the yoke, and the armature are disposed within the air chamber; and wherein the armature in relation to the yoke is disposed in such a manner that said armature, when the magnet coil is energized, by means of the magnetic force generated on account thereof rotates counter to a restoring force about a single rotation axis until the magnetic force corresponds to the restoring force, wherein the size of at least one overlap region between the yoke and the armature changes in the rotation of the armature, and an air gap is configured between the yoke and the armature in the at least one overlap region, wherein the spacing that is formed by the air gap between the yoke and the armature remains substantially constant in the direction of the rotation of the armature.

2. The solenoid valve as claimed in claim 1, wherein the solenoid valve is configured so that at least one of a constant magnetic force and a magnetic force that increases in a linear manner is configured by way of energizing the magnet coil, and the restoring force increases during the rotation of the armature.

3. The solenoid valve as claimed in claim 1, wherein a leaf spring for generating the restoring force is attached to the armature.

4. The solenoid valve as claimed in claim 1, wherein the yoke is contacted by the armature at at least one location.

5. The solenoid valve as claimed in claim 4, wherein the yoke is contacted by the armature at at least one location along the single rotation axis.

6. The solenoid valve as claimed in claim 1, wherein a lever mechanism on the armature is configured in such a manner that the magnetic force which arises at that end of the armature that is opposite to the rotation axis when the magnet coil is energized is converted to a greater force for at least one of closing an air opening and opening an air opening.

7. The solenoid valve as claimed in claim 6, wherein a protrusion is part of the lever mechanism.

8. The solenoid valve as claimed in claim 1, wherein the armature is rigidly connected to a protrusion on which a seal element is located, which seal element in the rotation of the armature by means of the magnetic force which is generated by energizing the magnet coil closes an air opening.

9. The solenoid valve as claimed in claim 8, wherein the seal element without the magnet coil being energized closes another air opening.

10. The solenoid valve as claimed in claim 1, wherein the armature comprises at least one opening into which an end of the yoke penetrates in the rotation of the armature, and herein the spacing formed by the air gap between the yoke and the armature remains substantially constant in the direction of the rotation of the armature.

11. The solenoid valve as claimed in claim 1, wherein the armature by way of a guide is secured against tilting of the rotation axis.

12. The solenoid valve as claimed in claim 11, wherein the guide comprises a guiding cam which extends through an opening of the armature.

13. The solenoid valve as claimed in claim 11, wherein the guide comprises a leaf spring which at at least one location is fixedly connected to the armature, and at at least one other location is fixedly connected to at least one of the coil body and the yoke.

14. The solenoid valve as claimed in claim 1, wherein the yoke is designed so as to be U-shaped, wherein an overlap region between the yoke and the armature is created at the end of at least one leg of the U-shaped yoke when the armature is rotated.

15. The solenoid valve as claimed in claim 11, wherein the guide is configured on a coil body that is associated with the magnet coil.

16. The solenoid valve as claimed in claim 1, wherein the air openings are disposed at opposite ends of the air chamber.

17. The solenoid valve as claimed in claim 16, wherein the magnet coil in terms of the longitudinal direction thereof extends between these opposite ends.

18. The solenoid valve as claimed in claim 1, wherein the magnet coil for energizing is connected to at least one pin which by way of a sealed opening is routed out of the air chamber toward a circuit board.

* * * * *